(12) United States Patent
Verrelst et al.

(10) Patent No.: US 11,015,647 B2
(45) Date of Patent: May 25, 2021

(54) DEVICE PROVIDED WITH A BEARING-IN-BEARING

(71) Applicant: ATLAS COPCO AIRPOWER, NAAMLOZE VENNOOTSCHAP, Wilrijk (BE)

(72) Inventors: Bjorn Verrelst, Wilrijk (BE); Hans Meeus, Brussels (BE)

(73) Assignee: ATLAS COPCO AIRPOWER, NAAMLOZE VENNOOTSCHAP, Wilrijk (BE)

(*) Notice: Subject to any disclaimer, the term of this patent is extended or adjusted under 35 U.S.C. 154(b) by 0 days.

(21) Appl. No.: 16/644,558

(22) PCT Filed: Aug. 10, 2018

(86) PCT No.: PCT/IB2018/056025
§ 371 (c)(1),
(2) Date: Mar. 5, 2020

(87) PCT Pub. No.: WO2019/048953
PCT Pub. Date: Mar. 14, 2019

(65) Prior Publication Data
US 2020/0263729 A1 Aug. 20, 2020

(30) Foreign Application Priority Data
Sep. 8, 2017 (BE) .................... 2017/5640

(51) Int. Cl.
*F16C 41/00* (2006.01)
*F16C 19/55* (2006.01)
(Continued)

(52) U.S. Cl.
CPC .............. *F16C 19/55* (2013.01); *F16C 19/08* (2013.01); *F16C 41/001* (2013.01);
(Continued)

(58) Field of Classification Search
CPC ........ F16C 19/08; F16C 19/55; F16C 41/001; F16C 41/004; F16C 2300/22;
(Continued)

(56) References Cited

U.S. PATENT DOCUMENTS 2,647,807 A * 8/1953 Brunstrum .............. F16C 19/55
384/461
2,789,021 A * 4/1957 Pedersen ................. F16C 19/55
384/461
(Continued)

FOREIGN PATENT DOCUMENTS

CN 101191521 A 6/2008
CN 100587283 C 2/2010
(Continued)

OTHER PUBLICATIONS

Machine Translation of JP-2002142406-A (Year: 2002).*
(Continued)

*Primary Examiner* — Alan B Waits
(74) *Attorney, Agent, or Firm* — Bacon & Thomas, PLLC

(57) ABSTRACT

A device includes a bearing-in-bearing with an inner ring, an intermediate ring and an outer ring. Between the inner ring and the intermediate ring and between the intermediate ring and the outer ring, inner roller elements, and outer roller elements, are attached, respectively. The bearing-in-bearing is attached between two components that can rotate in relation to each other, a shaft and a housing, of which one component is or can be connected to a drive. A transmission is provided between the intermediate ring and the driven component in order to drive the intermediate ring. The transmission is a contactless transmission.

24 Claims, 6 Drawing Sheets

(51) Int. Cl.
*H02K 49/10* (2006.01)
*F16C 19/08* (2006.01)
*F16C 19/16* (2006.01)
*F16H 48/42* (2012.01)

(52) U.S. Cl.
CPC .......... *F16C 41/004* (2013.01); *F16C 19/163* (2013.01); *F16C 2300/22* (2013.01); *F16C 2360/24* (2013.01); *F16C 2360/43* (2013.01); *F16C 2361/61* (2013.01); *F16H 2048/423* (2013.01); *H02K 49/102* (2013.01)

(58) Field of Classification Search
CPC .............. F16C 2360/24; F16C 2360/43; F16C 2361/61; F16H 2048/423; H02K 49/102
See application file for complete search history.

(56) References Cited

U.S. PATENT DOCUMENTS

| | | | | |
|---|---|---|---|---|
| 3,547,503 | A | * | 12/1970 | Konet .................... G01C 19/16 384/461 |
| 4,618,271 | A | * | 10/1986 | Li ........................ F16C 33/306 384/461 |
| 5,633,555 | A | | 5/1997 | Ackermann et al. |
| 6,115,213 | A | | 9/2000 | Ikeda et al. |
| 6,741,428 | B1 | | 5/2004 | Oveyssi |
| 2002/0153785 | A1 | * | 10/2002 | Fukuyama ............... H02K 7/14 310/66 |
| 2011/0080675 | A1 | * | 4/2011 | Boutaghou ............. F16C 19/55 360/294 |
| 2018/0087568 | A1 | * | 3/2018 | Kluge .................... F16C 19/55 |

FOREIGN PATENT DOCUMENTS

| | | | | |
|---|---|---|---|---|
| EP | 1199484 | A2 | 4/2002 | |
| GB | 647002 | | 12/1950 | |
| JP | S6241422 | A | 2/1987 | |
| JP | H028512 | A | 1/1990 | |
| JP | 2002142406 | A | * 5/2002 | ............. F16C 19/55 |
| JP | 2002147448 | A | 5/2002 | |
| JP | 2003307215 | | 10/2003 | |

OTHER PUBLICATIONS

International Search Report and Written Opinion in corresponding PCT Application No. PCT/IB2018/056025, dated Oct. 10, 2018.
International Preliminary Report on Patentability in corresponding PCT Application No. PCT/IB2018/056025, dated Nov. 11, 2019.

* cited by examiner

DEVICE PROVIDED WITH A BEARING-IN-BEARING

The present invention relates to a device provided with a bearing-in-bearing.

More particularly, the invention is intended for high speed applications.

BACKGROUND OF THE INVENTION

It is known that bearings for high speed applications present a challenge.

A typical high-speed application is a so-called turbo compressor, whereby an impeller rotates on a shaft at very high speeds. Also, in screw compressors, in particular oil-free screw compressors, screw vacuum pumps and turbo-molecular vacuum pumps a shaft is present that rotates at very high speeds.

Consequently the bearings used in such applications need to cope with these very high speeds.

An application of a bearing is typically characterised in terms of speed with the so-called 'n.dm' value, also known in English as the 'speed factor', representing the product of the speed n (in revolutions per minute or rpm) and the average bearing diameter dm (in millimetres or mm).

Another, analogue definition is the 'DN', where the inner diameter (in mm) is multiplied by the speed (in rpm). In the following, the 'n.dm' value will be used.

These 'n.dm' can range in value from $1 \times 10^6$ to $2 \times 10^6$ and higher in said high-speed applications.

Often, in the case of applications with 'n.dm' greater than $2 \times 10^6$ magnet bearings or air bearings are used. Magnet bearings, however, have the disadvantage that they are not only expensive, but also complex. Furthermore, like air bearings, they are often designed for a specific application, whereby they are only suitable for a limited range of uses. Air bearings are simpler than magnet bearings in terms of construction, but again the robustness of these bearings is critical.

Compared with magnet or air bearings, roller bearings are much less complex, yet, in order to be suitable for high-speed applications, very advanced materials must be used, such as ceramic materials for the roller elements and possibly also for the bearing rings, as well as adapted materials for the cage. Furthermore, these must also be specifically designed with extremely accurate tolerances and the oil supply and oil quality, must be controlled very closely for example in terms of purity. This means that such roller bearings can cope with higher speeds. However, with the very high speeds at which magnet and air bearings are used, the operating condition for such roller bearings is still too critical to guarantee a sufficiently long life for these roller bearings.

A bearing-in-bearing configuration is already known, for example in FR 582 661. Such known bearing-in-bearing configuration comprises an inner ring with a raceway on its outer radial surface, an intermediate ring with a raceway on its inner and outer radial surface and an outer ring with a raceway on its inner radial surface. Furthermore, such known bearing-in-bearing configuration comprises two sets of roller elements, namely a first set of roller elements in rolling contact with the raceways in the inner ring and intermediate ring and a second set of roller elements in rolling contact with the raceways in the intermediate ring and the outer ring. Raceways refers here to the place where the roller elements unwind on to the bearing ring, that being the inner ring, the intermediate ring and the outer ring. When the roller elements are spherical then the raceway is a narrow track on the bearing ring. When the roller elements are cylindrical, then the raceway is a track of the same width as the cylindrical roller elements.

So, such a known bearing-in-bearing configuration consists as it were of two concentric bearings, whereby the inner ring of the outer bearing also acts as the outer ring of the inner bearing or whereby said inner ring of the outer bearing and said outer ring of the inner bearing are joined together to form the intermediate ring of the bearing-in-bearing.

With such a bearing-in-bearing the speed is distributed or divided across two bearings. In this way, at least in theory, the 'n.dm' value should be distributed across both bearings.

Such a concept is already known from for example U.S. Pat. No. 2,789,021, yet it appears that, in order to work well at high speeds, the intermediate ring of such a bearing-in-bearing, must be driven, so that its speed can be controlled.

Without driving the intermediate ring—so in the case that both bearings rotate freely into each other and the one driven bearing propels the other as it were by friction alone, the speed will not be well distributed across both bearings, so that the 'n.dm' value of one of the two bearings can become too high. In this way the intended objective of a bearing-in-bearing to reduce the overall 'n.dm' value is negated and the situation can become even worse than when using a single, traditional bearing with an inner and outer ring for the same application.

Solutions are already known to drive the intermediate ring, such as for example mechanical or cinematically linked solutions with gears, belts and/or other bearings. Such solutions are illustrated and described in DD 49.729, GB 647.002, U.S. Pat. No. 4,618,271, JP H02-8512, JP S62-41422 and JP 2003-307215.

Said solutions have the disadvantage that they are complex and expensive. Furthermore they are unreliable because they comprise additional mechanical systems which must function at high speeds and are therefore very susceptible to failure.

In U.S. Pat. Nos. 6,741,428 and 6,115,213, a motor for use in a disk drive is described, which motor comprises a bearing assembly comprising an inner and an outer ball bearing with an intermediate ring connecting the inner and outer ball bearing. Hereby, both the inner ring of the inner ball bearing and one of the rings of the outer ball bearing are fixedly attached to a stationary motor base.

SUMMARY OF THE INVENTION

The purpose of the present invention is to provide a solution to any one of the aforementioned and/or other disadvantages.

The object of the present invention is a device provided with bearing-in-bearing with an inner ring, an intermediate ring and an outer ring, whereby between the inner ring and the intermediate ring and between the intermediate ring and the outer ring inner roller elements, outer roller elements are respectively provided, whereby the bearing-in-bearing with its inner ring and outer ring is provided between two components in the device that can rotate in relation to each other, a shaft and a housing, of which one component is or can be connected to a drive, characterized in that the device is provided with a transmission between the intermediate ring and the driven component in order to drive the intermediate ring, whereby this transmission is a contactless transmission.

Contactless transmission refers to a transmission whereby there is no (physical) contact between a part of the transmission that is connected with the intermediate ring and the part of the transmission that is connected with the driven component.

This can be achieved with a physical break or gap between the components.

An advantage is that by driving the intermediate ring its speed can be controlled, so that the speed is distributed or divided in an appropriate manner across the bearing-in-bearing.

Another advantage is that, being attached between the intermediate ring and the driven component, the transmission is used by the drive-generated torque to drive the intermediate ring and no external motor, drive or other power supply is required. In other words: no additional energy source and/or supply is required.

An additional advantage is also that, with the contactless propulsion of the intermediate ring, there is no requirement for the use of gears, belts or other mechanical connections, which are subject to wear and tear or defects, and which do not allow operation at high speeds.

In a practical embodiment the transmission, in order to be able to drive the intermediate ring without contact, comprises one or more permanent magnets which are set up in such a way that they also turn with the rotation of the driven bearing ring. Driven bearing ring refers to the bearing ring in the bearing-in-bearing that is connected with the component that is or can be connected to a drive and as a result rotates along with the driven component at the same speed.

Said one or more permanent magnets that are configured to rotate along with the driven bearing ring can, for example, be provided in a ring that is preferably set up in a concentric manner in relation to the bearing rings and that is connected with the driven bearing ring.

In a further practical embodiment the intermediate ring is connected with a braking ring of electrically conductive and preferably non-magnetic material. This intermediate ring is preferably set up in a concentric manner in relation to the bearing rings. A gap is provided between the one or more permanent magnets and the braking ring.

The one or more permanent magnets which are configured to rotate along with the driven bearing ring then induce so-called Eddy currents in this braking ring.

Preferably around the braking ring of electrically conductive and preferably non-magnetic material there is also a ring of magnetically conductive material such that the magnetic field generated by the permanent magnets is closed therein.

In this way the maximum magnetic field is conducted through the ring of electrically conductive material and many Eddy currents are generated therein. Because of this, this ring of electrically conductive and preferably non-magnetic material will also rotate and therefore also the intermediate ring. This phenomenon is also known as 'magnetic drag'.

Preferably, the gap between the one or more permanent magnets and the braking ring of electrically conductive and preferably non-magnetic material is smaller than one and a half millimetres, even more preferably smaller than one millimetre and preferably the gap is approximately half a millimetre wide.

In an alternative practical embodiment the transmission is provided with a thin film of fluid located in a gap in the transmission.

This thin film of fluid can be applied in a gap between a ring connected with the driven bearing ring and a ring connected with the intermediate ring.

Appropriate fluids are for example oil or another lubricant, which can also be used to lubricate the bearings themselves.

Preferably, the thickness of the gap is one hundred micrometre or less.

The operation is simple and as follows. When the driven bearing ring rotates, the ring connected with the driven bearing ring rotates at the same time. With the so-called viscous friction across the thin fluid film in the gap between the ring connected with the driven bearing ring and the ring connected with the intermediate ring, the ring connected with the driven bearing ring transmits a torque to the ring connected with the intermediate ring causing the ring connected with the intermediate ring, and therefore also the intermediate ring itself to rotate. This is also known as 'viscous drag'.

In the case that the intermediate ring is driven in a contactless manner by one or more permanent magnets rotating along with the driven bearing ring, a further practical embodiment consists of:
  the driven bearing ring being connected with a first ring with permanent magnets;
  the intermediate ring being connected with a ring with pole pieces; and
  the non-driven bearing ring being connected with a second ring with permanent magnets.

Pole pieces are blocks of magnetically conductive material, so with a high magnetic permeability, which attract as it were the magnetic field lines.

Preferably, a narrow gap is always provided between the first ring and the ring with pole pieces, and between the ring with pole pieces and the second ring, said gap having a thickness of a maximum of two millimetres, preferably a maximum of one millimetre and even more preferably a maximum of half a millimetre.

Preferably, the number of permanent magnets in said first ring and second ring with permanent magnets and the number of pole pieces in the ring with pole pieces is chosen to suit the speed with which the intermediate ring must rotate in relation to the driven bearing ring.

Preferably, by selecting the parameters of the rings with permanent magnets and of the ring with pole pieces the driving torque exerted on the intermediate ring is chosen in such a way that it is just enough to drive the intermediate ring to reach the desired speed and particularly to overcome the friction losses in the bearings and other losses, such as for example aerodynamic losses.

In this way the dimensions of the rings with permanent magnets and of the ring with pole pieces can be limited so that the unit can be made compact. A compact embodiment is cheaper and makes it easier to integrate such a bearing-in-bearing in a machine without major adjustments being required, which may cause negative side effects, such as for example longer shafts which can cause other mode shapes and vibration issues.

Such a drive or transmission is also known as 'magnetic drive' or 'magnetic gear'. Such 'magnetic drive' and/or 'magnetic gear' drives and/or transmissions as well as their design are described in U.S. Pat. No. 5,633,555 and the article "Analysis and Design Optimization of a Coaxial Surface-Mounted Permanent-Magnet Magnetic Gear" by Xiaoxu Zhang, Xiao Liu, Chao Wang and Zhe Chen in open access journal Energies published on 22 Dec. 2014.

In a further practical embodiment of a device according to the invention with a bearing-in-bearing whereby the intermediate ring is driven using 'magnetic drag' and/or 'viscous drag', the intermediate ring is slowed in a contactless manner using an electromagnetic force, whereby the intermediate ring is connected with a ring made of electrically conductive and preferably non-magnetic material and whereby the device with the bearing-in-bearing is provided with a stationary electromagnet in such a way that between the ring made of electrically conductive and preferably non-magnetic material and the electromagnet there is a gap across which the electromagnet can create an electromagnetic field in the ring of electrically conductive and preferably non-magnetic material.

Preferably, on the side facing away from the electromagnet of the ring of electrically conductive and preferably non-magnetic material, a ring of magnetically conductive material will be located, in which the field generated by the electromagnet is closed.

In this way the magnetic field generated by the electromagnet is guided to the maximum through the ring of electrically conductive and preferably non-magnetic material.

Therefore, when the intermediate ring rotates, by creating an electromagnetic field using the electromagnet in the ring made of electrically conductive and preferably non-magnetic material Eddy currents can be generated in the ring made of electrically conductive and preferably non-magnetic material, whereby the ring made of electrically conductive and preferably non-magnetic material will be slowed down, just as in a so-called Eddy current brake.

Therefore, simply by regulating the excitation of the electromagnet, namely by turning it on or off, the frequency, current and/or voltage, it is possible to regulate the braking in such a way that the ring made of electrically conductive and preferably non-magnetic material, and therefore also the intermediate ring, rotates at the desired speed.

Preferably, the device is provided with a sensor to measure the speed of the intermediate ring in order to accurately regulate its speed by controlling the electromagnet excitation, preferably in a so-called closed-loop with the sensor measurement. This measurement can be done directly with a sensor, but can also be derived indirectly from other parameters of the machine's operating condition.

Preferably, the device is hereby provided with a regulator, for example a steering unit or controller, which regulates the electromagnet excitation based on the output of said sensor.

The speed of the intermediate ring can, for example, be regulated in order to set other ratios between the speeds of the bearings constituting the bearing-in-bearing for different speed or load levels in the bearing-in-bearing.

Thus, for example another speed ratio can be set when starting up compared to the stationary pattern of, for example, a turbo machine the shaft of which supports on a bearing-in-bearing according to the invention.

It is also possible to adjust the speed ratio over time in order to achieve similar wear and tear for both bearings constituting the bearing-in-bearing in order thus to maximise the life of the entire bearing-in-bearing.

In a practical embodiment the intermediate ring is built of two concentric rings, which are attached to each other to form a whole using a press fitting or suchlike, whereby the inner concentric ring forms a first bearing together with the inner ring and the inner roller elements, and whereby the outer concentric ring forms a second bearing together with the outer ring and the outer roller elements which is provided concentrically around the first bearing.

An advantage of this is that the bearing-in-bearing can be constructed using two existing or standard bearings.

Of course, according to the invention it is not excluded that the bearing-in-bearing is made using a purpose-built intermediate ring.

The invention concerns both a device with a bearing-in-bearing whereby the inner ring is driven and the outer ring remains stationary (rotating shaft) and also a device with a bearing-in-bearing whereby the outer ring is driven and the inner ring remains stationary (stationary shaft).

In a preferred embodiment the inner ring, the intermediate ring and the inner roller elements and/or the intermediate ring, the outer ring and the outer roller elements form one of the following types of bearing:

single or double-row ball bearing;
single or double-row angular contact ball bearing;
four-point bearing;
single or double-row cylinder bearing;
tapered roller bearing;
swivel-joint roller bearing;
needle bearing;
thrust ball bearing;
cylindrical roller thrust bearing.

The invention can be realised for all such standard bearing types, which shows the versatility and potential of the invention.

The invention concerns both a device with a bearing-in-bearing that is oil-lubricated, and a device with a bearing-in-bearing that is grease-lubricated. Both types are suited to speeds greater than usual for standard bearings, namely for oil lubrication greater than $1.5 \times 10^6$ 'n.dm', or even $2.0 \times 10^6$ 'n.dm' and even greater than $2.6 \times 10^6$ 'n.dm' and, namely for grease lubrication, greater than $1 \times 10^6$ 'n.dm', or even $1.3 \times 10^6$ 'n.dm', and even greater than $1.6 \times 10^6$ 'n.dm'.

Such a bearing-in-bearing can therefore be used instead of magnetic or air bearings. In some situations it is therefore also possible to use grease-lubricated bearing-in-bearings rather than oil-lubricated high-speed bearings, so that no oil raceway is required, which is not only expensive in terms of investment and maintenance, but also always comes with a risk of oil contamination.

The invention also concerns a turbo machine, which contains a device according to the invention for the bearing of at least one shaft with an impeller.

The invention can also concern a screw compressor, which is provided with a device according to the invention for the bearing of at least one shaft with a rotor. Screw compressor may also refer to a screw vacuum pump or a screw blower.

BRIEF DESCRIPTION OF THE DRAWINGS

With the intention of better showing the characteristics of the invention, some preferred embodiments of a bearing-in-bearing according to the invention are described hereinafter, by way of an example without any limiting nature, with reference to the accompanying drawings, wherein.

DETAILED DESCRIPTION OF THE INVENTION

Figure 1:
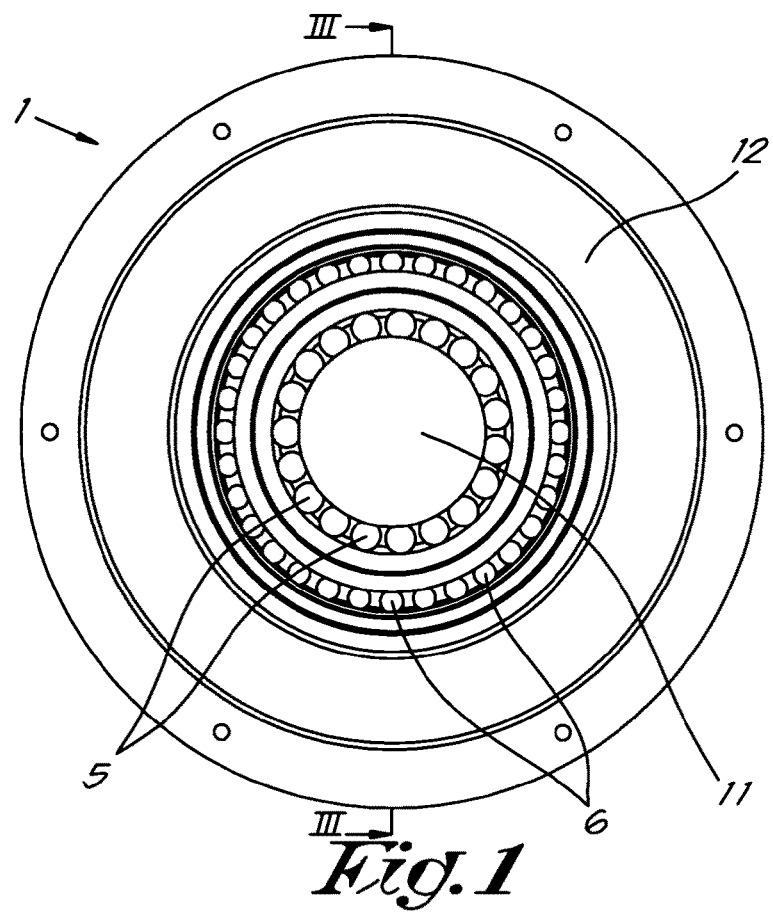
FIGS. 1 and 2 schematically show the front and the back respectively of a bearing-in-bearing according to the invention.
Figure 2:
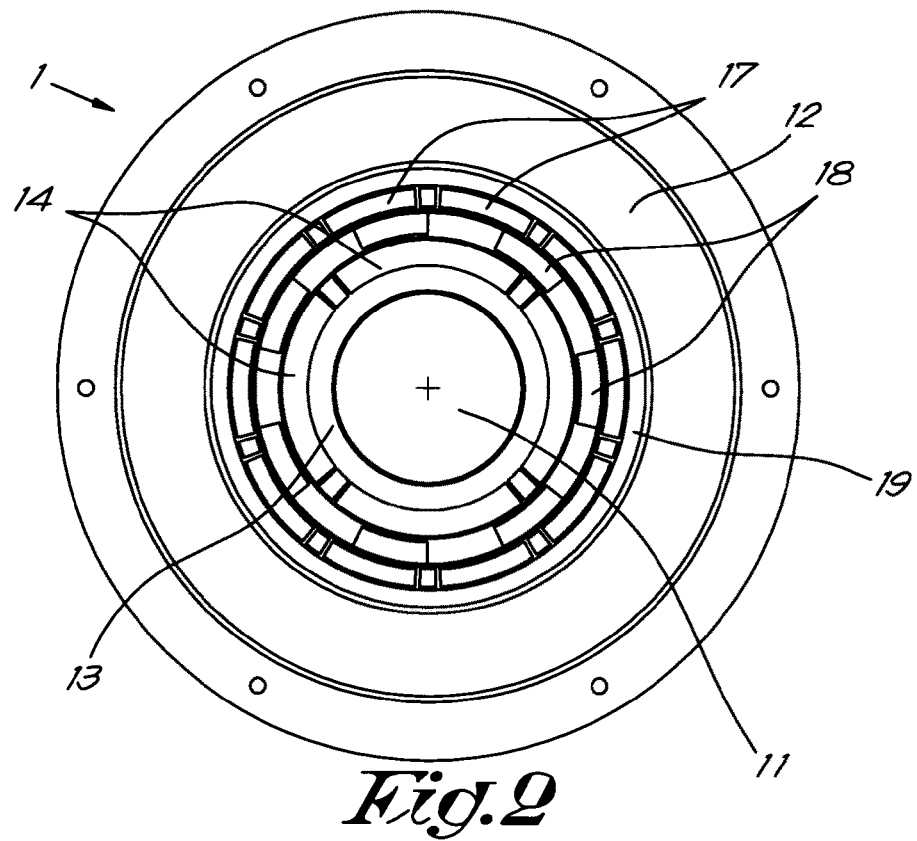
Figure 3:
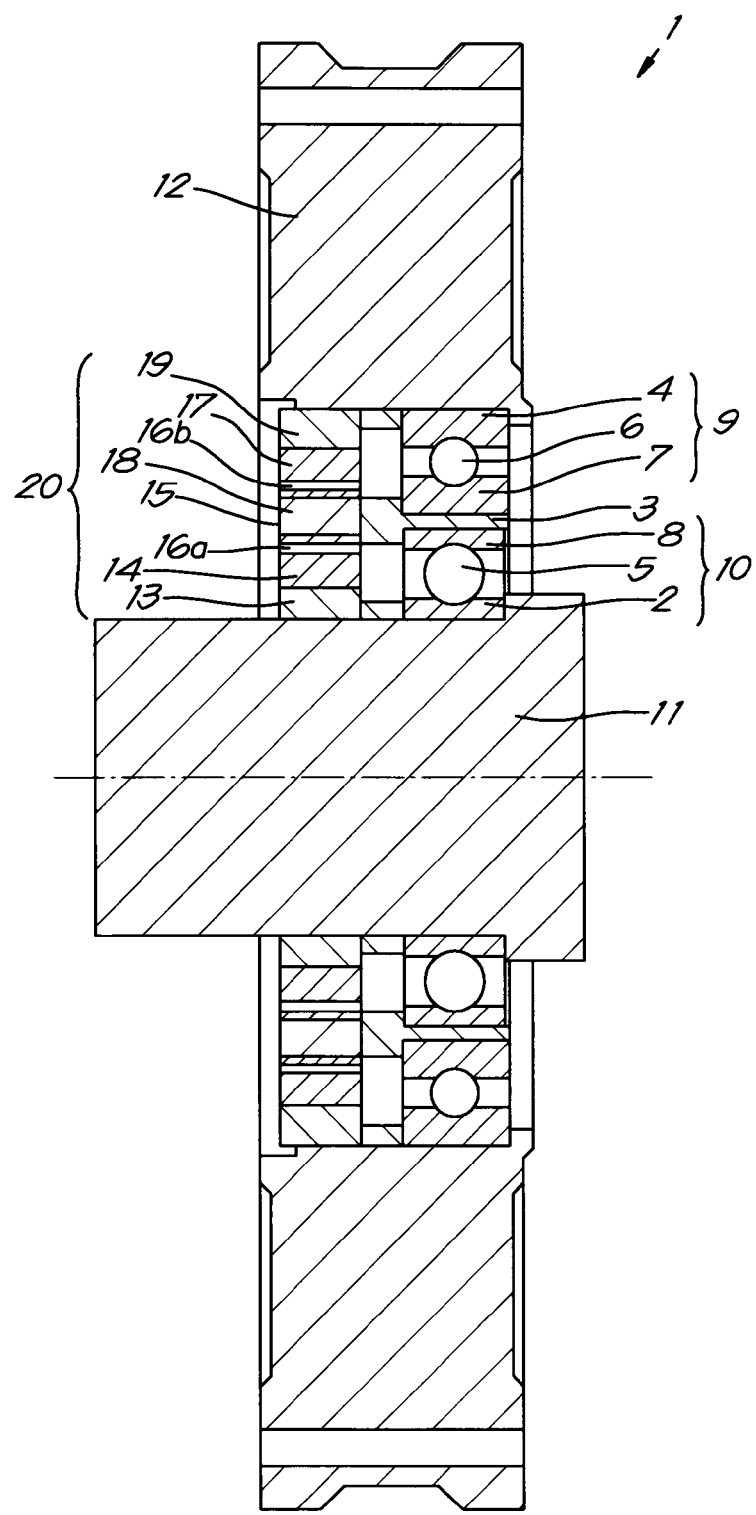
FIG. 3 shows a cross-section according to the line III-III in FIG. 1.

The bearing-in-bearing 1 shown in FIGS. 1 to 3 is constructed of an inner ring 2, intermediate ring 3 and an outer ring 4.

Inner roller elements 5 are provided between the inner ring 2 and the intermediate ring 3, while outer roller elements are provided between the outer ring 4 and the intermediate ring 3.

In this case the bearing-in-bearing 1 is constructed of two standard ball bearings, namely an outer ball bearing 9 and an inner ball bearing 10, which are concentric and the intermediate ring 3 is built of two concentric bearing rings, namely the inner ring 7 of the outer ball bearing 9 and the outer ring 8 of the inner ball bearing 10, and possibly even extra components such as rings.

The inner ring 7 of the outer ball bearing 9 is attached using a press fitting or suchlike to the outer ring 8 of the inner ball bearing 10 to form the intermediate ring 3 of the bearing-in-bearing 1.

As clearly shown in FIG. 3, the bearing-in-bearing 1 is provided around a rotating shaft 11, whereby the inner ring 2 of the bearing-in-bearing 1 is the driven bearing ring, driven by the torque from the rotating shaft 11.

The outer ring 4 of the bearing-in-bearing 1 is mounted in a housing 12.

Said rotating shaft 11 can for example be a shaft of a screw rotor of a compressor element and said housing 12 for example a compressor housing.

However, the bearing-in-bearing 1 can also be used in many other machines, such as for example turbo compressors, expanders, vacuum pumps, turbo molecular pumps, spindles, motors, turbines, jet engines, etc.

According to the invention, where the inner ring 2 is directly driven by the torque from the rotating shaft 11, the intermediate ring 3 is driven in a contactless manner by part of this torque.

In the embodiment of FIGS. 1 to 4, this driving is performed by a so-called magnetic gear.

As can be seen in FIG. 3, the inner ring 2 is connected with a first ring 13 with permanent magnets 14 and the intermediate ring 3 is connected with a ring 15 containing pole pieces 18.

Pole pieces 18 are blocks of magnetically conductive material.

The other material the ring 15 consists of holds the pole pieces 18 in place and is preferably a non-magnetic and non-electrically conductive material, such as for example a synthetic or composite material, so that no or little additional electromagnetic loss occurs in that material.

Between the first ring 13 with permanent magnets 14 and the ring 15 of non-magnetic and non-electrically conductive material in which the pole pieces 18 are fixed there is a gap 16a.

This gap 16a is approximately half a mm thick.

According to the invention the thickness of this gap 16a is smaller than one and a half mm, and preferably even smaller than one mm.

Furthermore the outer ring 4 is connected with a second ring 19 with permanent magnets 17.

Also, between the second ring 19 with permanent magnets 17 and the ring 15 with pole pieces 18 there is a gap 16b, whereby the gap 16b is also preferably smaller than one and a half mm, and more preferably even smaller than one mm. In this case the gap 16b is half a mm thick.

The first ring 13 and the second ring 19 with permanent magnets 14 and 17 respectively, and the ring 15 with pole pieces 18 jointly form a magnetic gear transmission 20 or 'magnetic gear'. Such magnetic gear transmissions 20 are discussed in U.S. Pat. No. 5,633,555 and in "A novel high-performance magnetic gear", K. Atallah, D. Howe, IEEE Transactions on Magnetics, vol. 37, No. 4, July 2001".

The permanent magnets 14 and 17 are placed with alternating polarity so that upon rotation of the rings 13 and 19 an alternating magnetic field is induced. The permanent magnets 14 and 17 each form a specific number of pole pairs, equal to half of the number of magnets in such a ring. The number of pole pairs corresponding with the number of permanent magnets 14 in the first ring 13 and the number of pole pairs corresponding with the number of permanent magnets 17 in the second ring 19 and the number of pole pieces 18 in the ring 15 is chosen depending on the speed at which the intermediate ring 3 must rotate in relation to the inner ring 2. These functions are known from literature.

The speed at which the intermediate ring 3 must rotate in relation to the inner ring 2, i.e. the driven bearing ring, depends on the application in which the bearing-in-bearing 1 will be used.

Preferably the number of permanent magnets 14, 17 in said first ring 13 and second ring 19 with permanent magnets 14, 17 and the number of pole pieces 18 in the ring 15 with pole pieces 18 is determined so that the intermediate ring 3 rotates at a slower speed than that of the driven bearing ring, preferably with a speed approximately equal to half the speed of the driven bearing ring.

The operation of the device 1 is very simple and as follows.

During use, the shaft 11 will rotate, whereby the inner ring 2 that is attached to the shaft 11 will rotate at the speed of the shaft 11.

Together with inner ring 2, the first ring 13 with permanent magnets 14 will also rotate.

The permanent magnets 14 generate magnetic fields across the gap 16a which are closed across the pole pieces 18 of magnetic material which are fixed in the ring 15. The ring 15 is connected with the intermediate ring 3.

Similarly the permanent magnets 17 which do not rotate generate magnetic fields across the gap 16b which are closed across the pole pieces 18 of magnetic material which are fixed in the ring 15.

Due to the discrete number of permanent magnets 14 and 17, and the discrete number of pole pieces 18 we obtain modulated magnetics fields in the air gaps 16a and 16b. By choosing the appropriate relationship between the number of permanent magnets 14, the number of pole pieces 18 and the number of permanent magnets 17, based on formulas known from literature as previously mentioned, the modulated fields in the air gaps 16a and 16b interact in a synchronised manner and allow the intermediate ring 3 to rotate in a particular ratio to the speed of the inner ring 2.

In this way the intermediate ring 3 will rotate at a particular speed ratio in relation to the driving shaft 11 without requiring an electrical motor with a high frequency controller.

The intermediate ring 3 is driven by a magnetic gear transmission 20, at a particular speed in relation to the inner ring 2, whereby the relationship between the speeds is fixed and determined by the number of permanent magnets 14 in the first ring 13 and the number of permanent magnets 17 in the second ring 19 and the number of pole pieces 18 in the ring 15.

The system as shown in FIGS. 1 to 3 is an entirely passive system, without any active control. It is clear that the embodiment as shown in these figures is simple, relatively cheap and robust.

Figure 4:
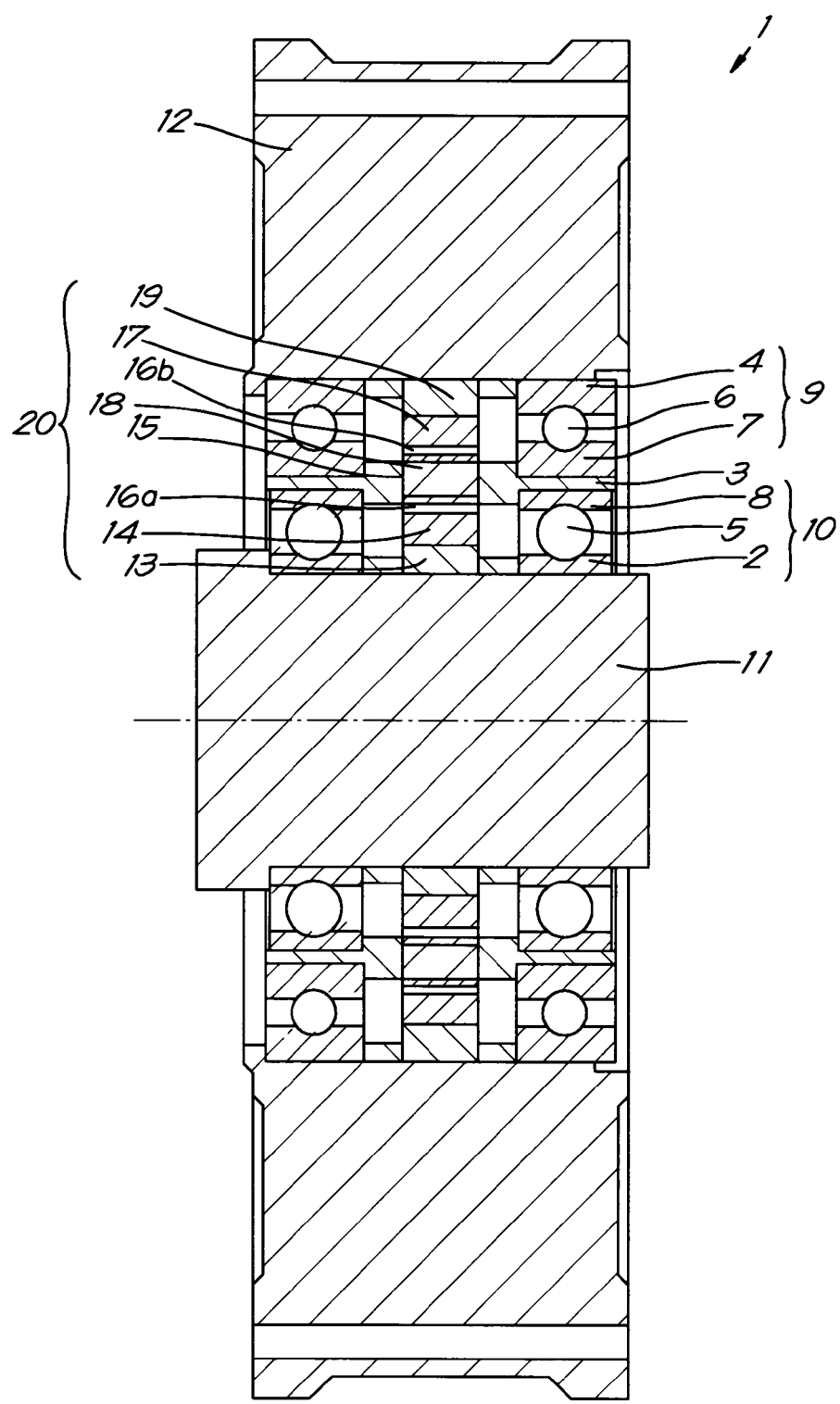
FIGS. 4 and 5 show alternative embodiments of FIG. 3.

In FIG. 4 a variant is shown according to FIG. 1, whereby in this case a double bearing-in-bearing 1 is illustrated, whereby a magnetic gear transmission 20 is attached between two adjacent bearing-in-bearings 1.

Or, in other words, a further bearing-in-bearing 1 is attached beside the magnetic gear transmission 20 in FIG. 3.

As shown in FIG. 4, both intermediate rings 3 are connected with the ring 15 with pole pieces 18.

Similarly both inner rings 2 and both outer rings 4 are connected respectively with the first ring 13 with permanent magnets 14 and second ring 19 with permanent magnets 17.

The magnetic gear transmission 20 will in other words control both bearing-in-bearings 1. Otherwise the operation is entirely similar to the previous embodiment.

Figure 5:
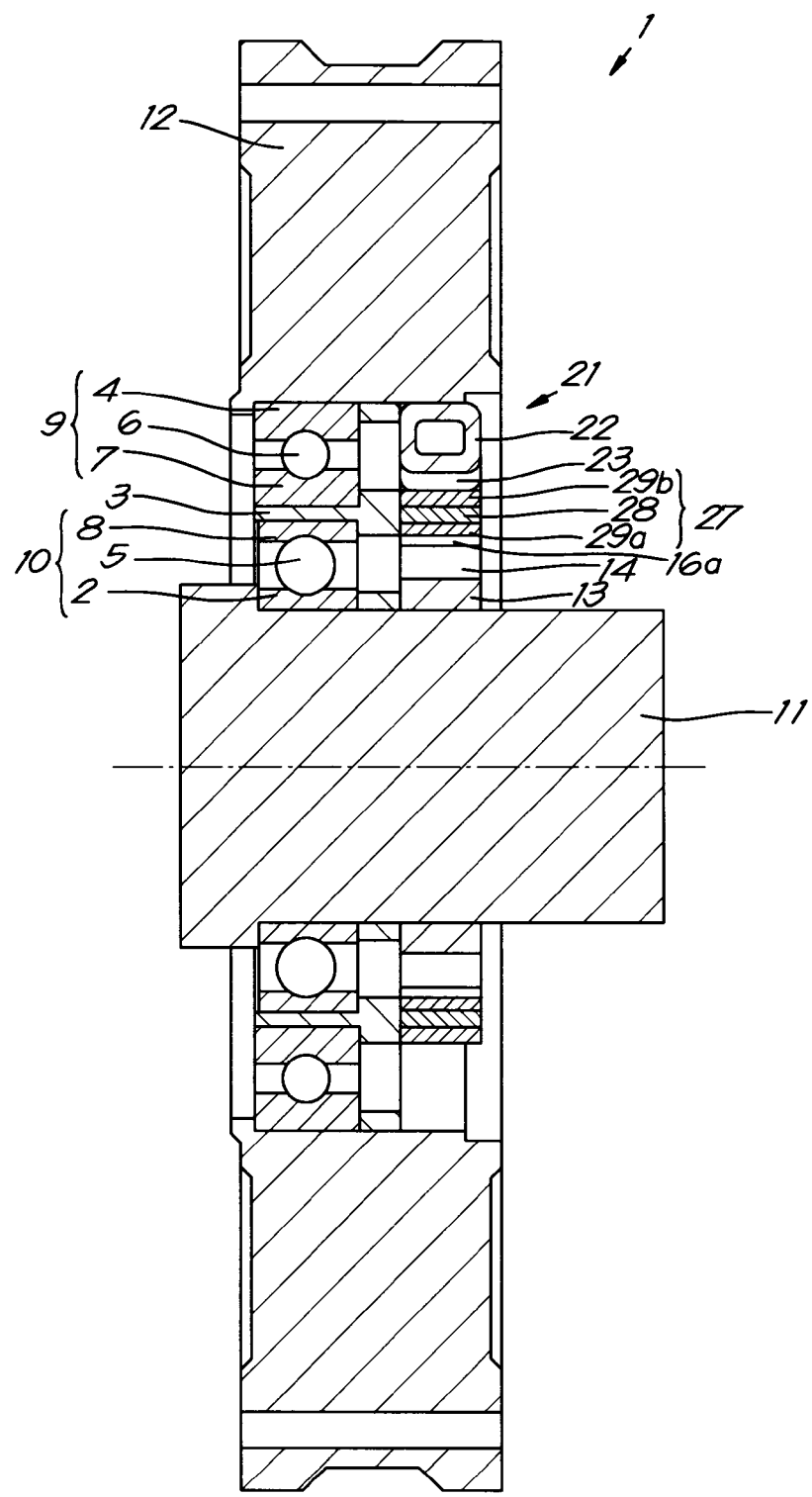
Figure 6:
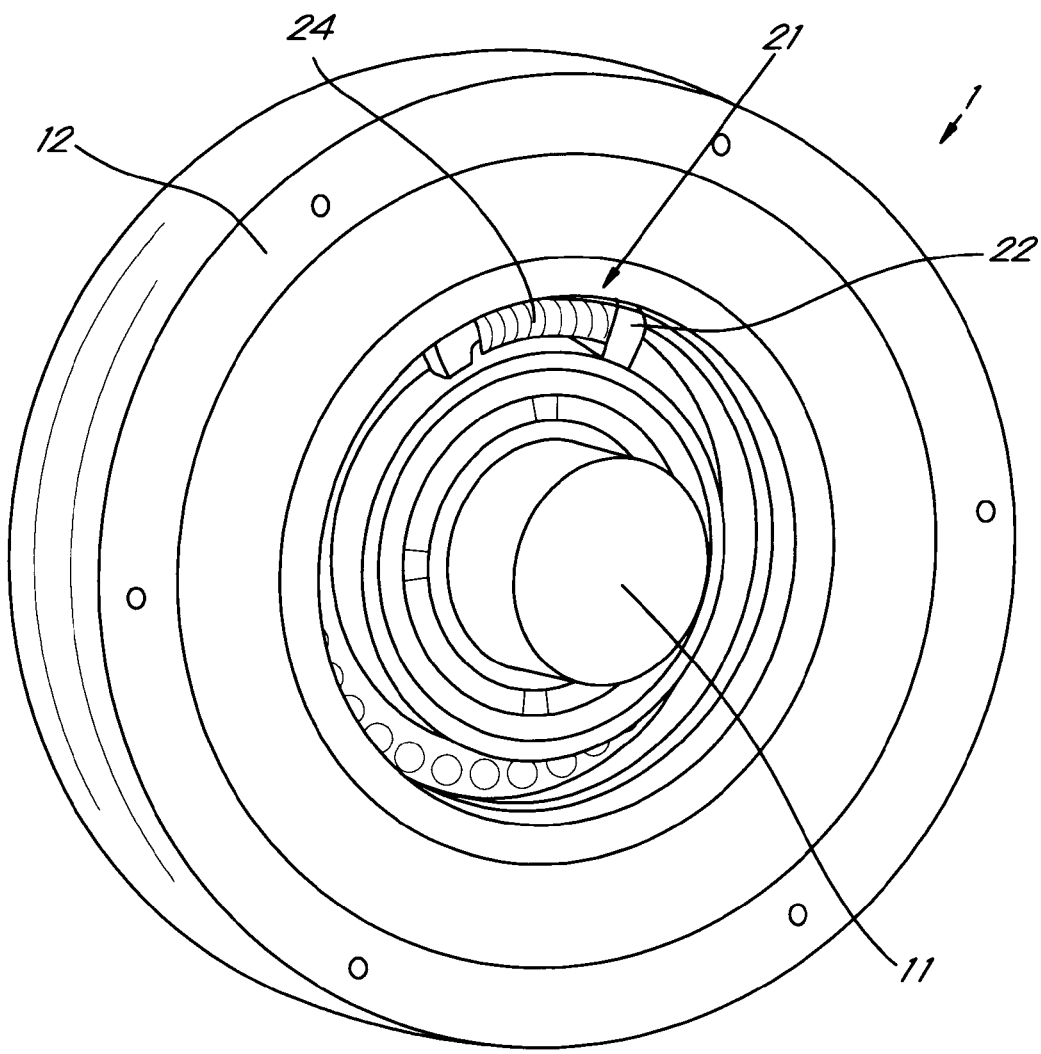
FIG. 6 schematically shows a perspective view of the bearing-in-bearing from FIG. 5.

FIGS. 5 and 6 show an alternative embodiment, whereby in this case the intermediate ring 3 is driven in a contactless manner by "magnetic drag", whereby the driven inner ring 2 is connected with a first ring 13 with permanent magnets 14 and the intermediate ring 3 is connected with a braking ring 27.

A potential embodiment for this braking ring 27 is shown in FIG. 5. The braking ring in this case consists of a ring 28 of magnetically conductive material, such as for example steel, and two rings 29a and 29b of non-magnetic yet electrically conductive material, such as for example aluminium, which are attached concentrically to the inside, respectively the outside of ring 28.

Between the first ring 13 with permanent magnets 14 and the ring 29a of electrically conductive material there is a gap 16a. This gap is approximately half a mm thick. According to the invention the thickness of this gap 16a is smaller than one and a half mm, and preferably even smaller than one mm.

The permanent magnets 14 are placed with alternating polarity so that, when the first ring 13 rotates, an alternating magnetic field is induced in the air gap 16a and in the ring 29a of non-magnetic yet electrically conductive material, and that is closed in the ring 28 of magnetically conductive material. As the material in the ring 29a is electrically conductive, so-called Eddy currents will be generated in the alternating magnetic field, leading to so-called Eddy current losses. In order to compensate these losses the ring 29a, and therefore also the braking ring 27, will start to rotate. The braking ring 27 is thus driven by "magnetic drag".

The torque with which this "magnetic drag" drives the braking ring 27, depends on different factors, such as the strength of the induced magnetic field, the speed difference between ring 13 and braking ring 27, and the construction and material properties of braking ring 27.

It shall be ensured that the intermediate ring 3 rotates faster than the desired speed for the specific bearing-in-bearing application, for example by choosing the appropriate thickness of the gap 16a and the number of permanent magnets 14 and their magnetic strength.

Again, in order to slow the intermediate ring 3 and allow it to rotate at the desired speed, use is made of a contactless transmission which also operates on the principle of so-called "eddy currents".

Use is made of a magnetic brake 21, a so-called 'Eddy current brake', which is formed by said ring 28 made of magnetically conductive material, the ring 29b made of non-magnetic yet electrically conductive material and a stationary electromagnet 22, which is provided in such a way that between the ring 29b made of non-magnetic yet electrically conductive material and the electromagnet 22 there is a gap 23 across which the electromagnet 22 can generate an electromagnetic field in the ring 29b and that is closed in the ring 28.

The gap 23 between the ring 29b and the stationary electromagnet 22 is of the same order of magnitude as said gaps 16a and 16b in the embodiment of FIGS. 1 to 3 between the first ring 13 and second ring 19, with respectively permanent magnets 14 and 17, and the ring 15.

By applying a current to the stationary electromagnet 22 when the braking ring 27 is rotating, Eddy currents will be generated in the ring 29b made of electrically conductive material, whereby the intermediate ring 3 will be slowed.

The extent to which braking occurs on the intermediate ring 3 will be determined by the size of the current and/or voltage, the way in which the power is turned on and off and the frequency.

A sensor, not shown on the figures, can be provided to determine the speed of the intermediate ring 3 and a control that sends a current through the electromagnet 22 based on the measured speed in order to be able to slow the intermediate ring 3 to the desired speed.

To this end the control can be provided with an algorithm to ensure that the 'n.dm' value of the inner bearing 10 is equal to the 'n.dm' value of the outer bearing 9, or that the ratio of both values lies within certain margins. In the present example this corresponds with a speed ratio of from 70-30 to 60-40. It is clear that this ratio can vary depending on the application.

In FIG. 6 the electromagnet 22 is clearly visible. This is stationary, which means that, in this case, this is fixed to the housing 12 and therefore will not rotate along with the bearing-in-bearing 1.

The electromagnet 22 is in this case horseshoe-shaped and provided with windings 24. However, this is only an illustrative example and the invention is not limited to this.

Although the embodiment from FIGS. 5 and 6 is not entirely passive and requires an additional control and sensor, this embodiment has the advantage of allowing the speed of the intermediate ring 3 to be freely controlled. In the previous embodiment the speed of the intermediate ring is fixed.

Figure 7:
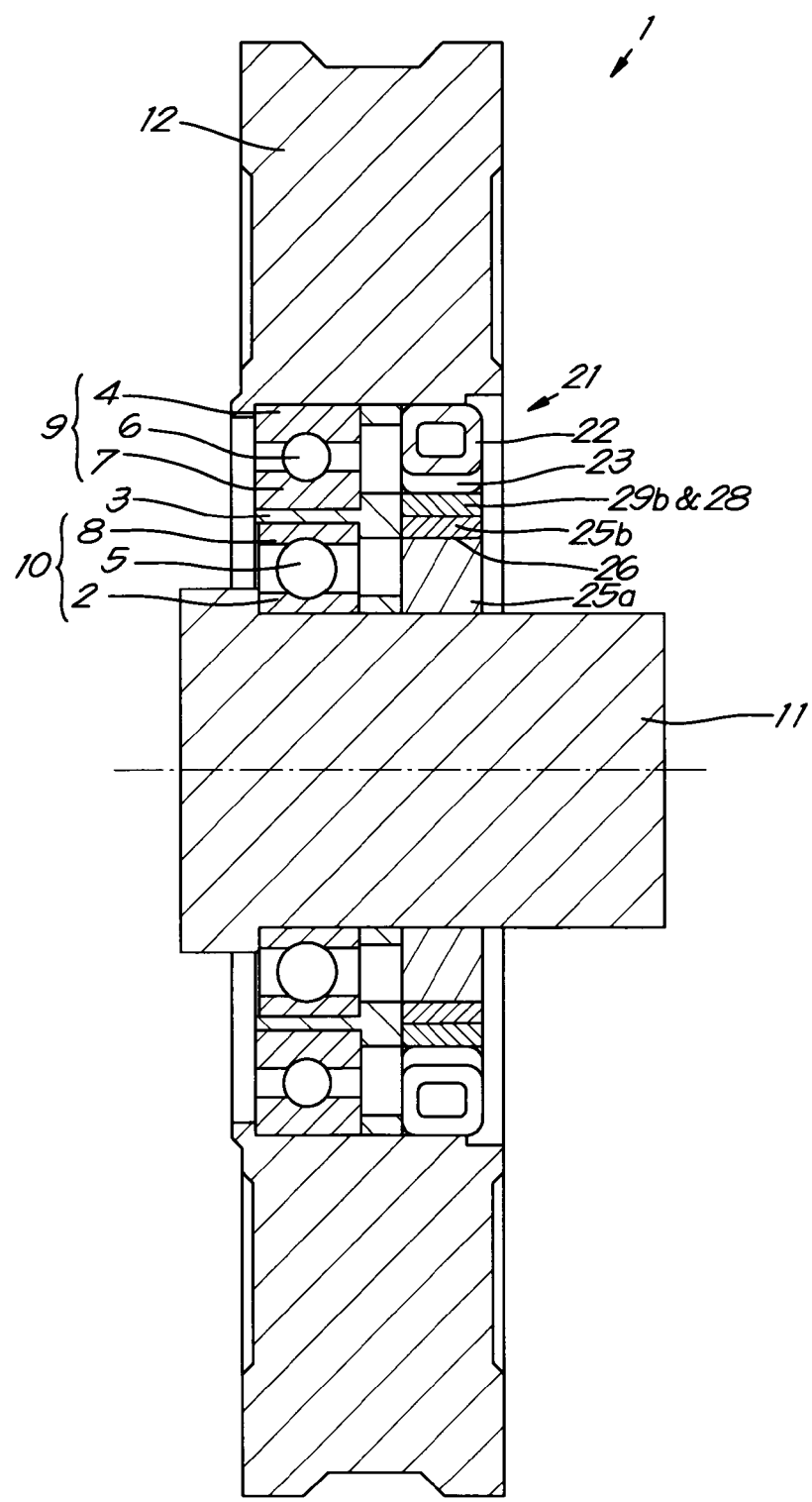
FIG. 7 shows another alternative embodiment of FIG. 3.

FIG. 7 shows a further variant, whereby in this case the slowing of the intermediate ring 3 will take place in the same way as in the example in FIGS. 5 and 6, i.e. with the magnetic brake 21, yet whereby the contactless driving in this case occurs using a viscous force of resistance or drag.

To do so both the inner ring 2 and the intermediate ring 3 are provided with a ring 25a, 25b, with a gap 26 between both rings 25a, 25b, whereby this gap 26 is filled with a fluid.

The thickness of this gap 26 depends on the fluid concerned. The fluid can for example be a lubricant, such as oil, or water.

In the case of oil, the thickness of the gap 26 is preferably 100 micrometres or smaller.

The operation of the contactless drive is based on the fact that, by rotating the inner ring 2, the intermediate ring 3' will start to rotate by the viscous force of resistance or drag created by the thin film of the fluid in the gap 26.

The thickness of the gap 26 will determine how much torque is generated and therefore also at what speed the intermediate ring 3 will rotate along.

Again it is ensured that the intermediate ring 3 will rotate too quickly so that this may be slowed to the desired speed with the magnetic brake 21.

An additional advantage of this embodiment is that the oil film in the gap 26 has a damping effect, allowing any vibrations to be accommodated.

All described bearing-in-bearings 1 can also be lubricated with grease. This means that the bearing-in-bearings 1 in FIGS. 1 to 6 and in FIG. 7, to the extent that no oil film is used, are suitable for oil-free applications, such as for example oil-free compressors, such as for example oil-free turbo or screw compressors.

Such grease-lubricated bearing-in-bearings 1 are suited to speeds greater than $1\times10^6$ 'n.dm' [revolutions per minute.millimetre], whereby the speed can even reach more than $1.3\times10^6$ 'n.dm' or $1.6\times10^{^\wedge6}$ 'n.dm'.

Alternatively the bearing-in-bearings 1 can also be lubricated with oil.

In this case the oil is preferably injected into the bearing-in-bearing 1 using an oil jet or oil mist.

Such bearing-in-bearings 1 are suited to very high speeds, greater than $1.5\times10^6$ 'n.dm' [revolutions per minute.millimetre], whereby speeds greater than $2.0\times10^6$ 'n.dm' and even greater than $2.6\times10^6$ 'n.dm' are possible.

Preferably, the bearing-in-bearing 1 is as compact as possible in axial terms, so that the shaft 11 on which the bearing-in-bearing 1 is mounted can be kept as short as possible, which is appropriate for use at very high speeds.

For this reason the power, and therefore also the torque, transmitted from the inner ring 2 to the intermediate ring 3 is best limited to a little more than the torque required to compensate the friction torque of the outer bearing so that the intermediate ring 3 rotates as well.

The width in axial terms of said gaps 16a, 16b, 23, 26 is preferably smaller than three times the width of the roller elements 5, 6 of the bearing-in-bearing 1, and even more preferably smaller than twice the width of the roller elements 5, 6.

This is completely different to the known magnetic gear transmissions 20 as documented in literature which in axial terms are not compact, given that these are designed for applications with much lower speeds, but with high torques.

Although, in the examples shown, the inner ring 2 is always driven by said torque, meaning that the inner ring 2 is mounted on a rotating shaft 11, and the outer ring 4 is stationary, and therefore attached in a housing 12, it is not excluded according to the invention that the outer ring 4 is driven by said torque and that the inner ring 2 is stationary.

The present invention is by no means limited to the embodiments described as an example and shown in the drawings, but a bearing-in-bearing according to the invention can be realised in all kinds of forms and dimensions without departing from the scope of the invention.

The invention claimed is:

1. A device provided with a bearing-in-bearing comprising: an inner ring, an intermediate ring and an outer ring, wherein between the inner ring and the intermediate ring and between the intermediate ring and the outer ring, inner roller elements and outer roller elements are respectively provided, wherein the bearing-in-bearing with the inner ring and the outer ring is provided between two components in the device that are rotatable in relation to each other, said two components being a shaft and a housing, of which one component is connected to a drive, wherein the device is provided with a transmission between the intermediate ring and the component connected to the drive in order to drive the intermediate ring, wherein the transmission is a contactless transmission, and either the inner ring or the outer ring is a driven bearing ring, which is driven via said component connected to the drive, wherein the transmission comprises one or more permanent magnets which rotate along with the driven bearing ring and a braking ring which is connected with the intermediate ring, the braking ring containing a ring of non-magnetic yet electrically conductive material, in such a way that there is a gap between the one or more permanent magnets and the braking ring.

2. The device according to claim 1, wherein the thickness of said gap is smaller than one and a half millimetres.

3. The device according to claim 1, wherein the braking ring around the ring of non-magnetic yet electrically conductive material contains a ring of magnetically conductive material.

4. The device according to claim 1, wherein a fluid film is applied in the gap in the transmission.

5. The device according to claim 4, wherein both the driven bearing ring and the intermediate ring are provided with a ring, with a gap between both rings, wherein the gap is filled with a fluid.

6. The device according to claim 5, wherein the thickness of said gap is one hundred micrometres or smaller.

7. The device according to claim 1, wherein the transmission to drive the intermediate ring is a magnetic gear transmission between the two components able to rotate in relation to each other.

8. The device according to claim 1, wherein the device is provided with a magnetic brake in order to slow the intermediate ring in a contactless manner.

9. The device according to claim 1, wherein, if the driven bearing ring is the inner ring, the intermediate ring is constructed of two concentric rings comprising an inner concentric ring and an outer concentric ring, attached to each other using a press fitting to form a whole, wherein the inner concentric ring joins the inner ring and the inner roller elements in forming a first bearing and wherein the outer concentric ring joins the outer ring and the outer roller elements in forming a second bearing that is attached concentrically around the first bearing.

10. The device according to claim 1, wherein the inner ring, the intermediate ring and the inner roller elements and/or the intermediate ring, the outer ring and the outer roller elements is a single or double-row ball bearing, a single or double-row angular contact ball bearing, four-point bearing, single or double-row cylinder bearing, tapered roller bearing, swivel-joint roller bearing, needle bearing, thrust ball bearing or cylindrical roller thrust bearing.

11. The device according to claim 10, wherein the bearing-in-bearing is usable for speeds greater than $1.5\times10^6$ 'n.dm' [revolutions per minute.millimetre].

12. The device according to claim 11, wherein the bearing-in-bearing is usable for speeds greater than $1\times10^6$ 'n.dm' [revolutions per minute.millimetre].

13. The device according to claim 1, wherein the bearing-in-bearing is oil-lubricated.

14. The device according to claim 1, wherein if the driven bearing ring is the inner ring, the bearing-in-bearing is grease-lubricated.

15. The turbo machine, wherein it contains a device according to claim 1 for the bearing of at least one shaft with an impeller.

16. The screw compressor, wherein it contains a device according to claim 1 for the bearing of at least one shaft with a rotor.

17. A device provided with a bearing-in-bearing comprising:
an inner ring,
an intermediate ring and
an outer ring, wherein between the inner ring and the intermediate ring and between the intermediate ring and the outer ring, inner roller elements and outer roller elements are respectively provided, wherein the bearing-in-bearing with the inner ring and the outer ring is provided between two components in the device that are rotatable in relation to each other, said two components being a shaft and a housing, of which one component is connected to a drive, wherein the device is provided with a transmission between the intermediate ring and the component connected to the drive in order to drive the intermediate ring, wherein the transmission is a contactless transmission, and either the inner ring or the outer ring is a driven bearing ring, which is driven via said component connected to the drive, wherein the transmission comprises one or more permanent magnets which rotate along with the driven bearing ring, wherein the driven bearing ring is connected with a concentric first ring with permanent magnets, the intermediate ring is connected with a concentric ring with pole pieces and the non-driven bearing ring is connected with a concentric second ring with permanent magnets.

18. The device according to claim 17, wherein there is a gap between the first ring and the ring with pole pieces, and between the ring with pole pieces and the second ring with a maximum thickness of two millimetres.

19. The device according to claim 17, wherein the number of permanent magnets in said first ring and second ring with permanent magnets and the number of pole pieces in the ring with pole pieces is determined in such a way that the intermediate ring rotates at a speed that is lower than the speed of the driven bearing ring.

20. The device according to claim 17, wherein there is a gap between the first ring and the ring with pole pieces, and between the ring with pole pieces and the second ring with a maximum thickness of half a millimetre.

21. The device according to claim 17, wherein the number of permanent magnets in said first ring and second ring with permanent magnets and the number of pole pieces in the ring with pole pieces is determined in such a way that the intermediate ring rotates at a speed that is lower than the speed equal to approximately half the speed of the driven bearing ring.

22. A device provided with a bearing-in-bearing comprising:
an inner ring,
an intermediate ring and
an outer ring,
wherein between the inner ring and the intermediate ring and between the intermediate ring and the outer ring, inner roller elements and outer roller elements are respectively provided, wherein the bearing-in-bearing with the inner ring and the outer ring is provided between two components in the device that are rotatable in relation to each other, said two components being a shaft and a housing, of which one component is connected to a drive, wherein the device is provided with a transmission between the intermediate ring and the component connected to the drive in order to drive the intermediate ring, wherein the transmission is a contactless transmission, and either the inner ring or the outer ring is a driven bearing ring, which is driven via said component connected to the drive, wherein the intermediate ring is slowed down in a contactless manner by an electromagnetic force, wherein the intermediate ring is connected with a ring made of non-magnetic yet electrically conductive material and wherein the device with the bearing-in-bearing is provided with a stationary electromagnet in such a way that between the ring and the electromagnet a gap is present across which the electromagnet can create an electromagnetic field in the ring.

23. The device according to claim 22, wherein the device is provided with a sensor to measure the speed of the intermediate ring.

24. The device according to claim 22, wherein the device is provided with a controller configured to regulate the excitation of the windings in the electromagnet based on the speed of the intermediate ring.

* * * * *